United States Patent
Heo et al.

(10) Patent No.: US 12,449,859 B2
(45) Date of Patent: Oct. 21, 2025

(54) HOUSING HAVING RECESS STRUCTURE AND ELECTRONIC DEVICE INCLUDING SAME

(71) Applicant: SAMSUNG ELECTRONICS CO., LTD., Suwon-si (KR)

(72) Inventors: Hyoseock Heo, Suwon-si (KR); Yongwon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 18/188,025

(22) Filed: Mar. 22, 2023

(65) Prior Publication Data
US 2023/0221770 A1     Jul. 13, 2023

Related U.S. Application Data

(63) Continuation of application No. PCT/KR2021/012714, filed on Sep. 16, 2021.

(30) Foreign Application Priority Data

Sep. 22, 2020 (KR) .......... 10-2020-0122109
Mar. 22, 2021 (KR) .......... 10-2021-0036607

(51) Int. Cl.
*G06F 1/16* (2006.01)
*H05K 5/04* (2006.01)

(52) U.S. Cl.
CPC .......... *G06F 1/1658* (2013.01); *G06F 1/1635* (2013.01); *H05K 5/04* (2013.01)

(58) Field of Classification Search
CPC ........ G06F 1/1658; G06F 1/1635; H05K 5/04
See application file for complete search history.

(56) References Cited

U.S. PATENT DOCUMENTS 8,270,914 B2 * 9/2012 Pascolini ............. H01Q 7/00
                                                   343/702
2009/0264160 A1 * 10/2009 Mochizuki ......... H04M 1/185
                                                   455/566

(Continued)

FOREIGN PATENT DOCUMENTS

JP          2013-106196 A    5/2013
KR    10-2019-0037739 A      4/2019

(Continued)

OTHER PUBLICATIONS

Kim WO 2020060216 A1 M (Year: 2020).*
Korean Examination Report dated Feb. 28, 2025 for KR Application No. 10-2021-0036607.

*Primary Examiner* — Allen L Parker
*Assistant Examiner* — Elisa Sasserath
(74) *Attorney, Agent, or Firm* — Nixon & Vanderhye P.C.

(57) ABSTRACT

An electronic device according to various embodiments of the present disclosure comprises: a first metal housing formed along an edge of the electronic device; a second metal housing spaced apart from at least a portion of the first metal housing; and an injection structure comprising a non-conductive material and at least a portion of which is disposed between the first housing and the second housing, wherein the injection structure and the second metal housing include a recess part on which an electric component disposed along an inner edge of the electronic device is seated, the second metal housing includes a first part connected to the first metal housing and a second part spaced apart from the first metal housing, the first metal housing includes a protrusion part, and the protrusion part may extend to the first part and be joined to the first part.

11 Claims, 10 Drawing Sheets

(56) References Cited

U.S. PATENT DOCUMENTS

| | | | |
|---|---|---|---|
| 2013/0286560 A1* | 10/2013 | Liu | H04M 1/0262 |
| | | | 361/679.01 |
| 2020/0076057 A1* | 3/2020 | Leutheuser | H01Q 1/12 |
| 2020/0260605 A1 | 8/2020 | Lee et al. | |
| 2021/0004058 A1* | 1/2021 | Lim | H05K 5/04 |

FOREIGN PATENT DOCUMENTS

| | | | | |
|---|---|---|---|---|
| KR | 10-2019-0098607 A | | 8/2019 | |
| WO | WO-2020060216 A1 * | | 3/2020 | H01Q 1/243 |

* cited by examiner

HOUSING HAVING RECESS STRUCTURE AND ELECTRONIC DEVICE INCLUDING SAME

CROSS-REFERENCE TO RELATED APPLICATIONS

This application is a continuation of International Application No. PCT/KR2021/012714 designating the United States, filed on Sep. 16, 2021, in the Korean Intellectual Property Receiving Office and claiming priority to Korean Patent Application No. 10-2020-0122109, filed on Sep. 22, 2020, in the Korean Intellectual Property Office, and to Korean Patent Application No. 10-2021-0036607, filed on Mar. 22, 2021, in the Korean Intellectual Property Office, the disclosures of all of which are incorporated by reference herein in their entireties.

BACKGROUND

Field

The disclosure relates to a housing having a recess structure formed therein and an electronic device including the same.

Description of Related Art

Along with the remarkable development of information and communication technology and semiconductor technology, the proliferation and use of various electronic devices have been rapidly increasing. The development trend of electronic devices is toward communication with portability.

An electronic device may refer to a device that performs a specific function according to a loaded program, such as an electronic notebook, a portable multimedia player, a mobile communication terminal, a tablet PC, a video/audio device, a desktop/laptop computer, or a vehicle navigation device as well as a home appliance. For example, these electronic devices may output stored information as sound or an image. As the integration level of electronic devices increases and high-speed and large-capacity wireless communication becomes common, a single electronic device such as a mobile communication terminal may be equipped with various functions. For example, an entertainment function such as games, a multimedia function such as music/video playback, a communication and security function for mobile banking, schedule management, or an electronic wallet function as well as a communication function are integrated into one electronic device. Such electronic devices are being miniaturized so that users may conveniently carry them.

In an electronic device, the performance of a mounting structure formed by injection may be degraded in the rigidity and waterproofing of the electronic device. Moreover, the mounting structure formed by injection increases the thickness of a housing wall, thereby reducing an accommodation space for a battery.

SUMMARY

According to various example embodiments of the disclosure, an electronic device may include: a first metal housing formed along an edge of the electronic device; a second metal housing formed spaced apart from at least part of the first metal housing; and an injection structure at least partially disposed between the first metal housing and the second metal housing, and comprising a non-conductive material. The injection structure and the second metal housing may include a recess part disposed along an inner edge of the electronic device, to mount an electrical component therein, the second metal housing may include a first part connected to the first metal housing, and a second part spaced apart from the first metal housing, the first metal housing may include a protrusion part, and the protrusion part may be extend to the first part and be bonded to the first part.

According to various example embodiments of the disclosure, a method of manufacturing an electronic device may include: connecting a first metal housing including a protrusion part to a second metal housing; forming an injection structure disposed between the first metal housing and the second metal housing and comprising a non-conductive material; and forming a recess part disposed along an inner edge of the electronic device, to mount an electrical component therein, by processing the second metal housing and the injection structure. The second metal housing may be at least partially spaced apart from the first metal housing, and include a first part connected to the first metal housing and a second part formed spaced apart from the first metal housing. The first metal housing may include a protrusion part extending to the first part and be bonded to the first part.

According to various example embodiments of the disclosure, a recess structure is formed of a metal in a housing included in an electronic device, thereby increasing rigidity and reinforcing waterproofing.

According to various example embodiments of the disclosure, because a recess structure is formed of a metal in a housing included in an electronic device, the thickness of a housing wall may be decreased, and thus an accommodation space for a battery may be secured.

The effects achievable from the disclosure are not limited to what has been described above, and other unmentioned effects will be clearly understood by those skilled in the art from the following description.

BRIEF DESCRIPTION OF THE DRAWINGS

The above and other aspects, features and advantages of certain embodiments of the present disclosure may be more apparent from the following detailed description, taken in conjunction with the accompanying drawings, in which.

DETAILED DESCRIPTION

Figure 1:
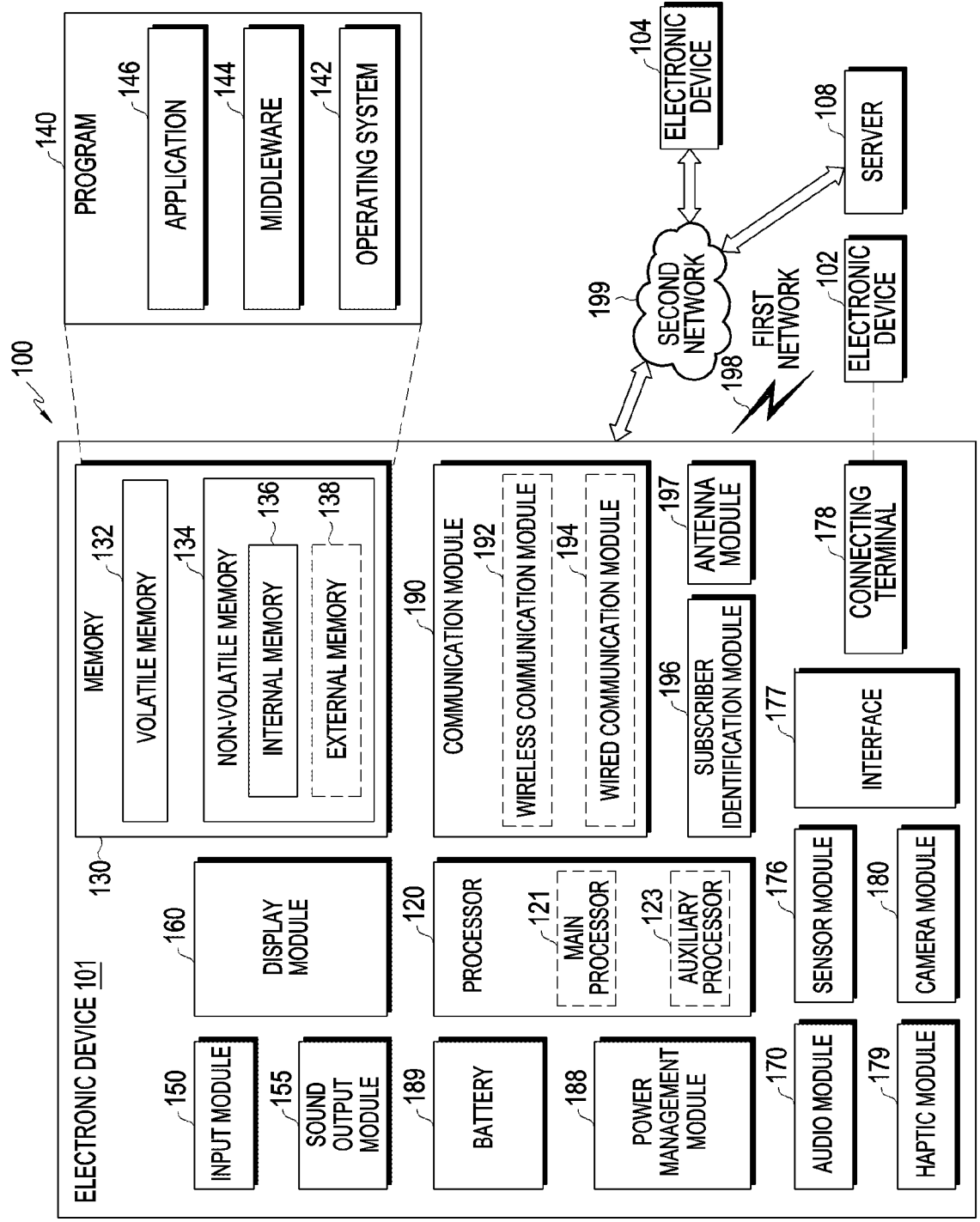
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the non-transitory storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
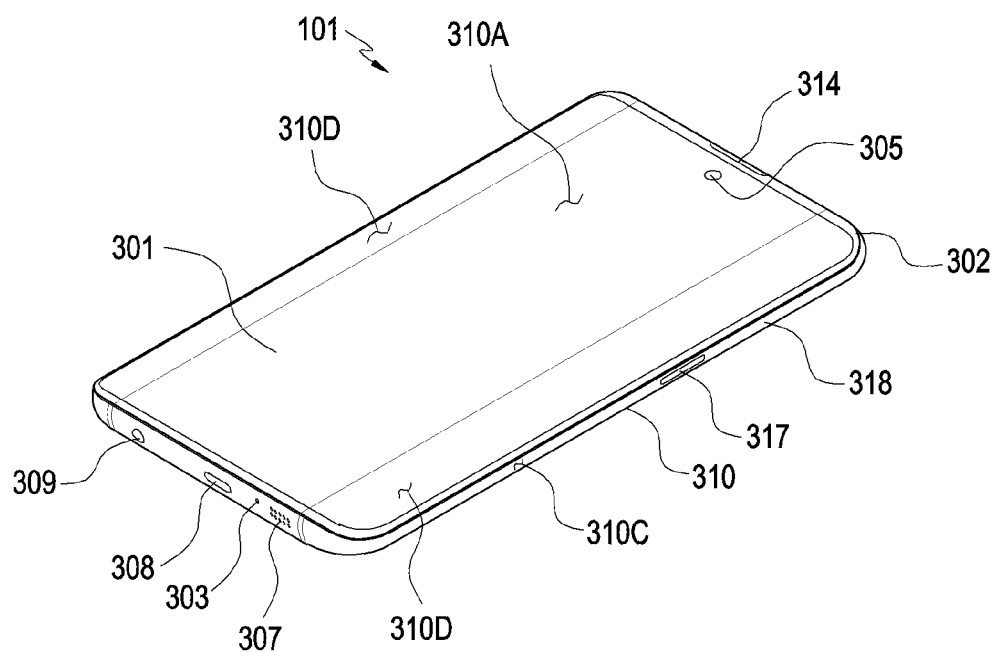
FIG. 2 is a front perspective view illustrating an electronic device according to various embodiments.
Figure 3:
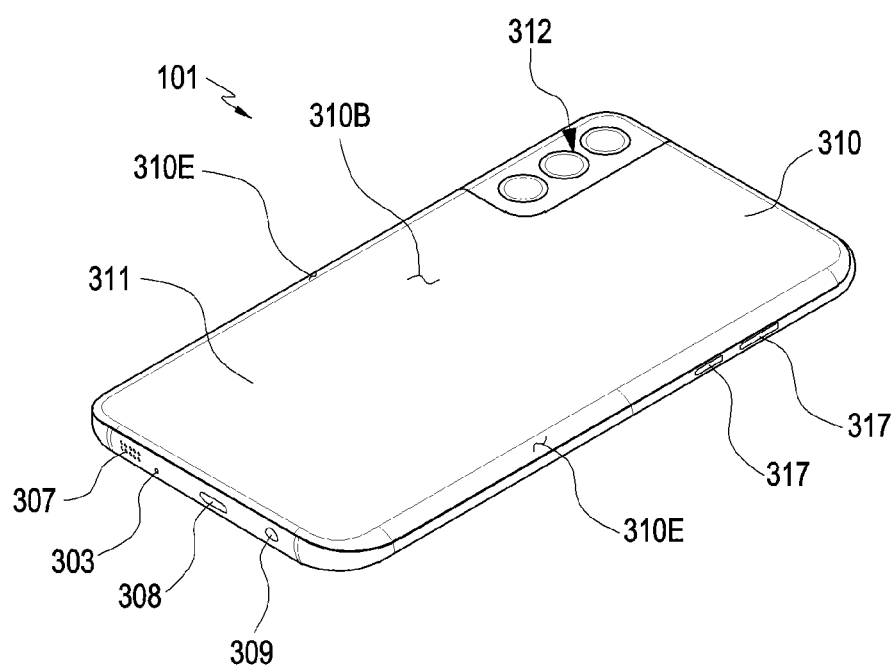
FIG. 3 is a rear perspective view illustrating an electronic device according to various embodiments.

FIG. 2 is a front perspective view illustrating an example electronic device according to various embodiments. FIG. 3 is a rear perspective view illustrating the electronic device according to various embodiments.

Referring to FIGS. 2 and 3, the electronic device 101 according to an embodiment may include a housing 310 which includes a front surface 310A, a rear surface 310B, and side surfaces 310C surrounding a space between the front surface 310A and the rear surface 310B. In an embodiment (not shown), the housing may refer to a structure that forms part of the front surface 310A, the rear surface 310B, and the side surfaces 310C of FIG. 2. According to an embodiment, at least part of the front surface 310A may be formed by a front plate 302 (e.g., a glass plate or polymer plate including various coating layers) which is substantially transparent. The rear surface 310B may be formed by a rear plate 311. The rear plate 311 may be formed of, for example, glass, ceramic, a polymer, a metal (e.g., aluminum, stainless steel (STS), or magnesium), or a combination of at least two of these materials. The side surfaces 310C may be coupled with the front plate 302 and the rear plate 311 and formed by a side bezel structure (or "side member") 318 including a metal and/or a polymer. In a certain embodiment, the rear plate 311 and the side bezel structure 318 may be integrally formed and include the same material (e.g., glass, a metal material such as aluminum, or ceramic).

In the illustrated embodiment, the front plate 302 may include two first edge areas 310D bent and extending seamlessly from the front surface 310A toward the rear plate 311, at both ends of long edges of the front plate 302. In the illustrated embodiment (refer to FIG. 3), the rear plate 311 may include two second edge areas 310E bent and extending seamlessly from the rear surface 310B toward the front plate 302 at both ends of long edges of the rear plate 311. In a certain embodiment, the front plate 302 (or the rear plate 311) may include only one of the first edge areas 310D (or the second edge areas 310E). In an embodiment, some of the first edge areas 310D or the second edge areas 310E may not be included. In the above embodiments, when viewed from a side of the electronic device 101, the side bezel structure 318 may have a first thickness (or width) on side surfaces without the first edge areas 310D or the second edge areas 310E, and a second thickness smaller than the first thickness on side surfaces with the first edge areas 310D or the second edge areas 310E.

According to an embodiment, the electronic device 101 may include at least one of a display 301, audio modules 303, 307, and 314 (e.g., the audio module 170 of FIG. 1), a sensor module (e.g., the sensor module 176 of FIG. 1), camera modules 305 and 312 (e.g., the camera module 180 of FIG. 1), key input devices 317 (e.g., the input device 150 of FIG. 1), or connector holes 308 and 309 (e.g., the connecting terminal 178 of FIG. 1). In a certain embodiment, the electronic device 101 may not be provided with at least one (e.g., the connector hole 309) of the components or additionally include other components.

According to an embodiment, the display 301 may be visually exposed (as used herein, the terms "exposed", "visually exposed", "visible" or the like used with respect to a display may be used interchangeably and may refer to being visible through, for example a cover glass, cover plate, or the like), for example, through a substantial portion of the front plate 302. In a certain embodiment, at least part of the display 301 may be visible through the front surface 310A and the front plate 302 forming the first edge areas 310D. In a certain embodiment, the corners of the display 301 may be formed in the same shapes as those of adjacent peripheral portions of the front plate 302 on the whole. In an embodiment (not shown), the gap between the periphery of the display 301 and the periphery of the front plate 302 may be equal on the whole to increase the visible area of the display 301.

According to an embodiment, a surface (or the front plate 302) of the housing 310 may include a view area formed by visual exposure of the display 301. For example, the view area may include the front surface 310A and the first edge areas 310D.

In an embodiment (not shown), a recess or an opening may be formed in part of the view area (e.g., the front surface 310A and the first edge areas 310D) of the display 301, and include at least one of the audio module 314, the sensor module (not shown), a light emitting element (not shown), or the camera module 305, which is aligned with the recess or the opening. In an embodiment (not shown), at least one of the audio module 314, the sensor module (not shown), the camera module 305, a fingerprint sensor (not shown), or the light emitting element (not shown) may be included on the rear surface of the view area of the display 301. In an embodiment (not shown), the display 301 may be incorporated with or disposed adjacent to a touch sensing circuit, a pressure sensor that measures the intensity (pressure) of a touch, and/or a digitizer that detects a magnetic field-based stylus pen. In a certain embodiment, at least some of the key input devices 317 may be disposed in the first edge areas 310D and/or the second edge areas 310E.

According to various embodiments, the first camera module 205 among the camera modules 305 and 312, and/or the sensor module may be disposed in the internal space of the electronic device 101 to communicate with an external environment through a transmissive area of the display 301. According to an embodiment, an area of the display 301 facing a first camera module 305 may be formed to be a transmissive area having a specified transmittance, as part of a content display area. According to an embodiment, the transmissive area may be formed to have a transmittance in a range of about 5% to about 20%. This transmissive area may include an area overlapping with an effective area (e.g., an angle of view area) of the first camera module 305 through which light for generating an image passes to form an image by an image sensor. For example, the transmissive area of the display 301 may include an area having a lower pixel density and/or a lower wiring density than its surrounding area. For example, the transmissive area may replace a recess or an opening.

According to an embodiment, the audio modules 303, 307, and 314 may include, for example, a microphone hole 303 and speaker holes 307 and 314. A microphone for obtaining an external sound may be disposed in the microphone hole 303, and in a certain embodiment, a plurality of microphones may be disposed to detect the direction of a sound. The speaker holes 307 and 314 may include an external speaker hole 307 and a receiver hole 314 for calls. In a certain embodiment, the speaker holes 307 and 314 and the microphone hole 303 may be implemented as a single hole, or a speaker (e.g., a piezo speaker) may be included without the speaker holes 307 and 314. The audio modules 303, 307, and 314 may be designed in various manners such as installation of only some audio modules or addition of a new audio module according to the structure of the electronic device 101, not limited to the above structure.

According to an embodiment, the sensor module (not shown) may generate, for example, an electrical signal or data value corresponding to an internal operation state or external environmental state of the electronic device 101. The sensor module (not shown) may include, for example, a first sensor module (e.g., a proximity sensor) disposed on the front surface 310A of the housing 310 and/or a second sensor module (e.g., a fingerprint sensor) and/or a third sensor module (e.g., a heart rate monitor (HRM) sensor) disposed on the rear surface 310B of the housing 310 and/or a fourth sensor module (e.g., a fingerprint sensor). In a certain embodiment (not shown), the fingerprint sensors may be disposed on the rear surface 310B as well as on the front surface 310A (e.g., the display 301) of the housing 310. The electronic device 101 may further include a sensor module (not shown), for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor. The sensor module may be designed in various manners such as installation of only some sensor modules or addition of a new sensor module according to the structure of the electronic device 101, not limited to the above structure.

According to an embodiment, the camera modules 305 and 312 may include, for example, the first camera module 305 disposed on the front surface 310A of the electronic device 101 and a second camera module 312 disposed on the rear surface 310B of the electronic device 101, and/or a flash (not shown). The camera modules 305 and 312 may include one or more lenses, an image sensor, and/or an image signal processor. The flash (not shown) may include, for example, a light emitting diode (LED) or a xenon lamp. In a certain embodiment, two or more lenses (an IR camera, a wide-angle lens, and a telephoto lens) and image sensors may be arranged on one surface of the electronic device 101. The camera modules 305 and 312 may be designed in various manners such as installation of only some camera modules or addition of a new camera module according to the structure of the electronic device 101, not limited to the above structure.

According to an embodiment, the electronic device 101 may include a plurality of camera modules (e.g., a dual camera or a triple camera) each having a different attribute (e.g., angle of view) or function. For example, a plurality of camera modules 305 and 312 including lenses having different angles of view may be configured, and the electronic device 101 may control to change of the angles of view of the camera modules 305 and 312 implemented in the electronic device 101 based on a user selection. For example, at least one of the plurality of camera modules 305 and 312 may be a wide-angle camera, and at least one other camera module may be a telephoto camera. Similarly, at least one of the plurality of camera modules 305 and 312 may be a front camera, and at least one other camera module may be a rear camera. Further, the plurality of camera modules 305 and 312 may include at least one of a wide-angle camera, a telephoto camera, or an IR camera (e.g., a time of flight (TOF) camera or a structured light camera). According to an embodiment, the IR camera may be operated as at least part of the sensor module. For example, the TOF camera may be operated as at least part of a sensor module (not shown) for detecting a distance to a subject.

According to an embodiment, the key input devices 317 may be arranged on side surfaces 310C of the housing 310. In an embodiment, the electronic device 101 may not include some or any of the above key input devices 317, and the key input devices 317 which are not included may be implemented in other forms such as soft keys on the display 301. In a certain embodiment, the key input devices may include the sensor module 316 disposed on the rear surface 310B of the housing 310.

According to an embodiment, the light emitting element (not shown) may be disposed, for example, on the front surface 310A of the housing 310. The light emitting element (not shown) may provide, for example, state information about the electronic device 101 in the form of light. In an embodiment, the light emitting element (not shown) may provide a light source interworking, for example, with an operation of the front camera module 305. The light emitting element (not shown) may include, for example, an LED, an IR LED, and/or a xenon lamp.

According to an embodiment, the connector holes 308 and 309 may include a first connector hole 308 that may accommodate a connector (e.g., a universal serial bus (USB) connector) for transmitting and receiving power and/or data to and from an external electronic device, and/or a second connector hole 309 (e.g., an earphone jack) that may accommodate a connector for transmitting and receiving an audio signal to and from an external electronic device.

According to an embodiment, the first camera module 305 among the camera modules 305 and 312, and/or some of sensor modules (not shown) may be disposed to be exposed to the outside through at least part of the display 301. For example, the camera module 305 may include a punch hole camera disposed in a hole or recess formed on the rear surface of the display 301. According to an embodiment, the camera module 312 may be disposed inside the housing 310 such that a lens is exposed from the second surface 310B of the electronic device 101. For example, the camera module 312 may be disposed on a printed circuit board (e.g., a printed circuit board 340 of FIG. 4).

According to an embodiment, the first camera module 305 and/or the sensor module may be disposed from the internal space of the electronic device 101 to the front plate 302 of the display 301 to communicate with an external environment through a transparent area. Further, some sensor module 304 may be disposed in the internal space of the electronic device to perform its function without being visually exposed through the front plate 302.

Figure 4:
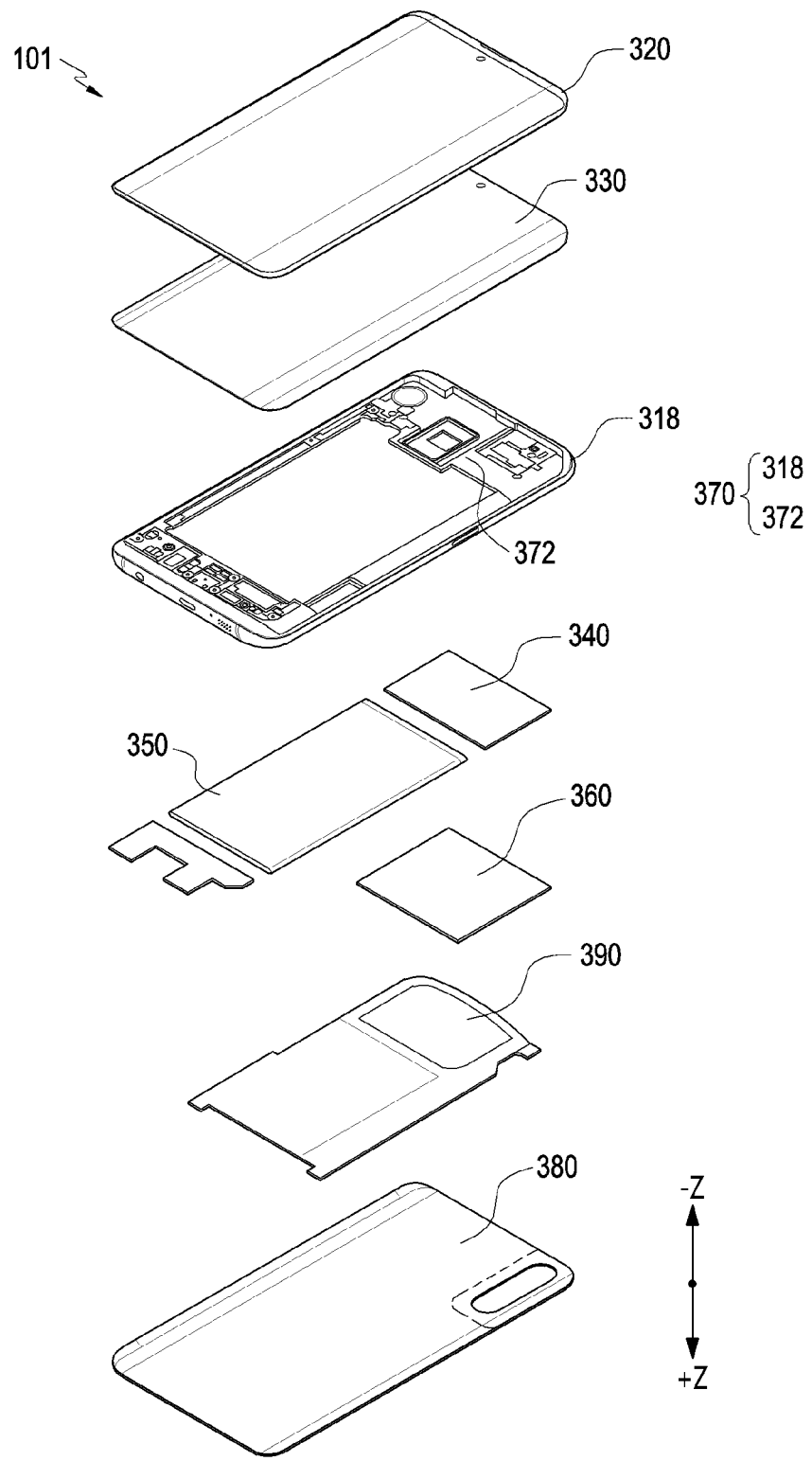
FIG. 4 is an exploded perspective view illustrating an electronic device according to various embodiments.

FIG. 4 is an exploded perspective view illustrating an electronic device according to various embodiments.

Referring to FIG. 4, the electronic device 101 (e.g., the electronic device 101 of FIGS. 1 to 3) according to various embodiments may include a support bracket 370, a front plate 320 (e.g., the front plate 302 of FIG. 2), a display 330 (e.g., the display 301 of FIG. 2), the printed circuit board 340 (e.g., a PCB, a flexible PCB (FPCB), or a rigid flexible PCB (RFPCB)), a battery 350 (e.g., the battery 189 of FIG. 1), a second support member 360 (e.g., a rear case), an antenna 390 (e.g., the antenna module 197 of FIG. 1), and a rear plate 380 (e.g., the rear plate 311 of FIG. 2). The support bracket 370 of the electronic device 101 according to an embodiment may include a side bezel structure 318 (e.g., the side bezel structure 318 of FIG. 2 and a first support member 372).

In a certain embodiment, the electronic device 101 may not be provided with at least one (e.g., the first support member 332 or the second support member 360) of the components or additionally include other components. At least one of the components of the electronic device 101 may be the same as or similar to at least one of the components of the electronic device 101 of FIG. 2 or 3, and a redundant description will be avoided below.

According to various embodiments, the first support member 332 may be disposed inside the electronic device 101, and may be connected to or integrally formed with the side bezel structure 318. The first support member 372 may be formed of, for example, a metal material and/or a non-metal (e.g., polymer) material. The first support member 372 may have the display 330 coupled with one surface thereof and the printed circuit board 340 coupled with the other surface thereof.

According to various embodiments, the printed circuit board 340 may have a processor, memory, and/or an interface mounted thereon. The processor may include, for example, at least one of a CPU, an application processor, a graphics processor, an image signal processor, a sensor hub processor, or a communication processor. According to various embodiments, the printed circuit board 340 may include an FPCB-type radio frequency cable (FRC). For example, the printed circuit board 340 may be disposed on at least part of the first support member 372, and electrically connected to an antenna module (e.g., the antenna module 197 of FIG. 1) and a communication module (e.g., the communication module 190 of FIG. 1).

According to an embodiment, the memory may include, for example, volatile memory or non-volatile memory.

According to an embodiment, the interface may include, for example, a high definition multimedia interface (HDMI), a universal serial bus (USB) interface, an SD card interface, and/or an audio interface. The interface may, for example, electrically or physically connect the electronic device 101 to an external electronic device, and include a USB connector, an SD card/MMC connector, or an audio connector.

According to various embodiments, the battery 350 is a device for supplying power to at least one component of the electronic device 101, and may include, for example, a non-rechargeable primary battery, a rechargeable secondary battery, or a fuel cell. At least part of the battery 350 may be disposed substantially on the same plane as the printed circuit board 340, for example. The battery 350 may be integrally disposed inside the electronic device 101 or detachably from the electronic device 101.

According to various embodiments, the second support member 360 (e.g., the rear case) may be disposed between the printed circuit board 340 and the antenna 390. For example, the second support member 360 may include one surface with which at least one of the printed circuit board 340 or the battery 350 is coupled, and the other surface with which the antenna 390 is coupled.

According to various embodiments, the antenna 390 may be disposed between the rear plate 380 and the battery 350. The antenna 390 may include, for example, a near field communication (NFC) antenna, a wireless charging antenna, and/or a magnetic secure transmission (MST) antenna. The antenna 390 may, for example, perform short-range communication with an external device or wirelessly transmit and receive power required for charging to and from the external device. In an embodiment, an antenna structure may be formed by part of the side bezel structure 318 and/or part of the first support member 372 or a combination thereof.

According to various embodiments, the rear plate 380 may form at least part of the rear surface (e.g., the rear surface 310B of FIG. 3) of the electronic device 101.

The above-described antenna structure and electronic device including the same according to various embodiments of the disclosure are not limited by the foregoing embodiment and drawings. It will be apparent to those skilled in the art that many replacements, modifications, and variations can be made within the technical scope of the disclosure.

Figure 5:
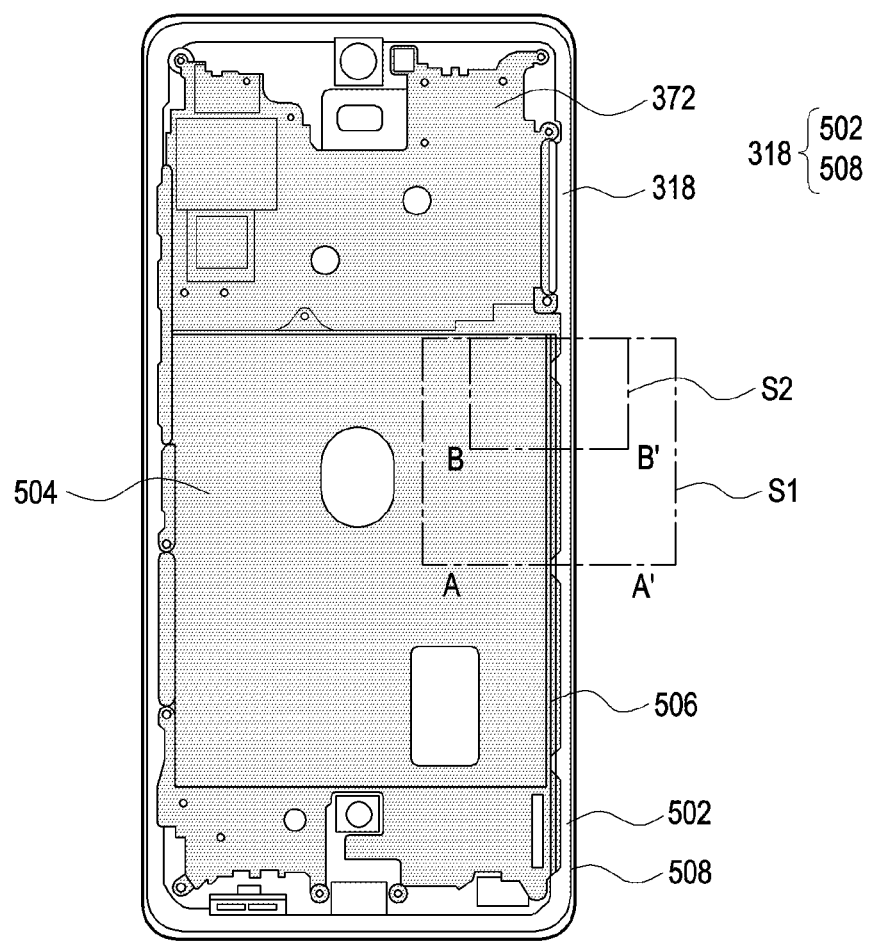
FIG. 5 is diagram illustrating an electronic device from which a front plate is removed according to various embodiments.
Figure 6:
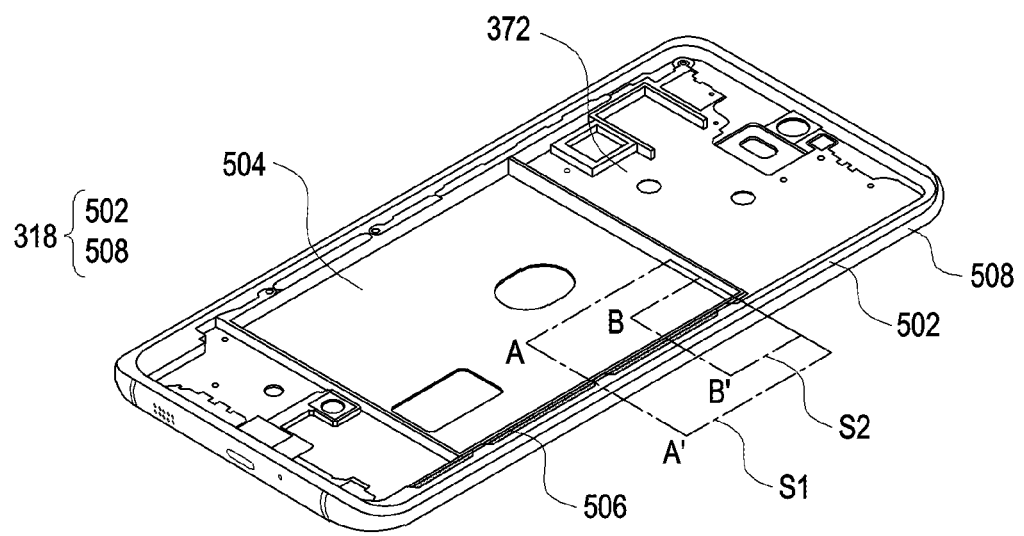
FIG. 6 is perspective view illustrating an internal space of an electronic device from which a front plate is removed, from a different angle according to various embodiments.

FIG. 5 is a diagram illustrating an internal view of an electronic device from which a front plate is removed according to various embodiments. FIG. 6 is an perspective view illustrating an electronic device from which a front plate is removed, from a different angle according to various embodiments.

According to various embodiments, an electronic device (e.g., the electronic device 101 of FIGS. 1 to 4) may include a housing (e.g., the housing 310 of FIGS. 2 and 3), a printed circuit board (e.g., the printed circuit board 340 of FIG. 4), a battery (e.g., the battery 350 of FIG. 4), and/or an injection structure 502. According to an embodiment, the housing 310 may include a support bracket (e.g., the support bracket 370 of FIG. 4) formed along the side surfaces of the electronic device 101, a front plate (e.g., the front plate 320 of FIG. 4) that covers the front surface of the electronic device, and a rear plate (e.g., the rear plate 380 of FIG. 4) that covers the rear surface of the electronic device 101. According to an embodiment, the support bracket 370 may include a first support member (e.g., the first support member 372 of FIG. 4) and a side bezel structure (e.g., the side bezel structure 318 of FIG. 4)).

Hereinafter, in an embodiment, the side bezel structure 318 may refer, for example, to a structure including the injection structure 502 and a first metal housing 508, and the first support member 372 may refer, for example, to a second metal housing.

The configurations of the first support member 372 and the side bezel structure 318 of FIGS. 5 and 6 may be partially or wholly identical to those of the first support member 372 and the side bezel structure 318 of FIGS. 2 to 4.

According to various embodiments, the first support member 372 may include a battery accommodation groove 504 and a recess structure 506. A part of the first support member 372 may be coupled with the injection structure 502. Another part of the first support member 372 may be connected to a part of the first metal housing 508 or may be formed to be spaced apart from another part of the first metal housing 508. The first support member 372 may be formed of a metal material, and the metal material may be aluminum material or Mg and various casting materials (e.g., die casting materials such as S33N and S36). The first support member 372 may be bonded to the first metal housing 508 through an anti-slip process (e.g., an anti-slip process S1002 and S1004 in FIG. 10).

Figure 9:
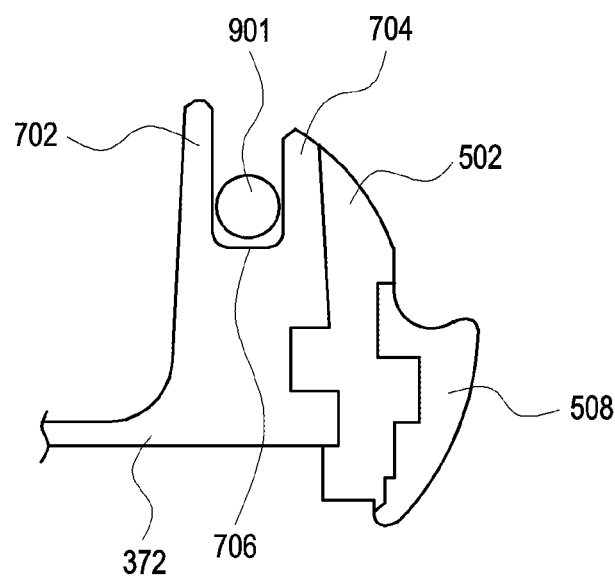
FIG. 9 is a cross-sectional view including a wiring, taken along line B-B' in FIG. 5 or FIG. 6 according to various embodiments.
Figure 10:
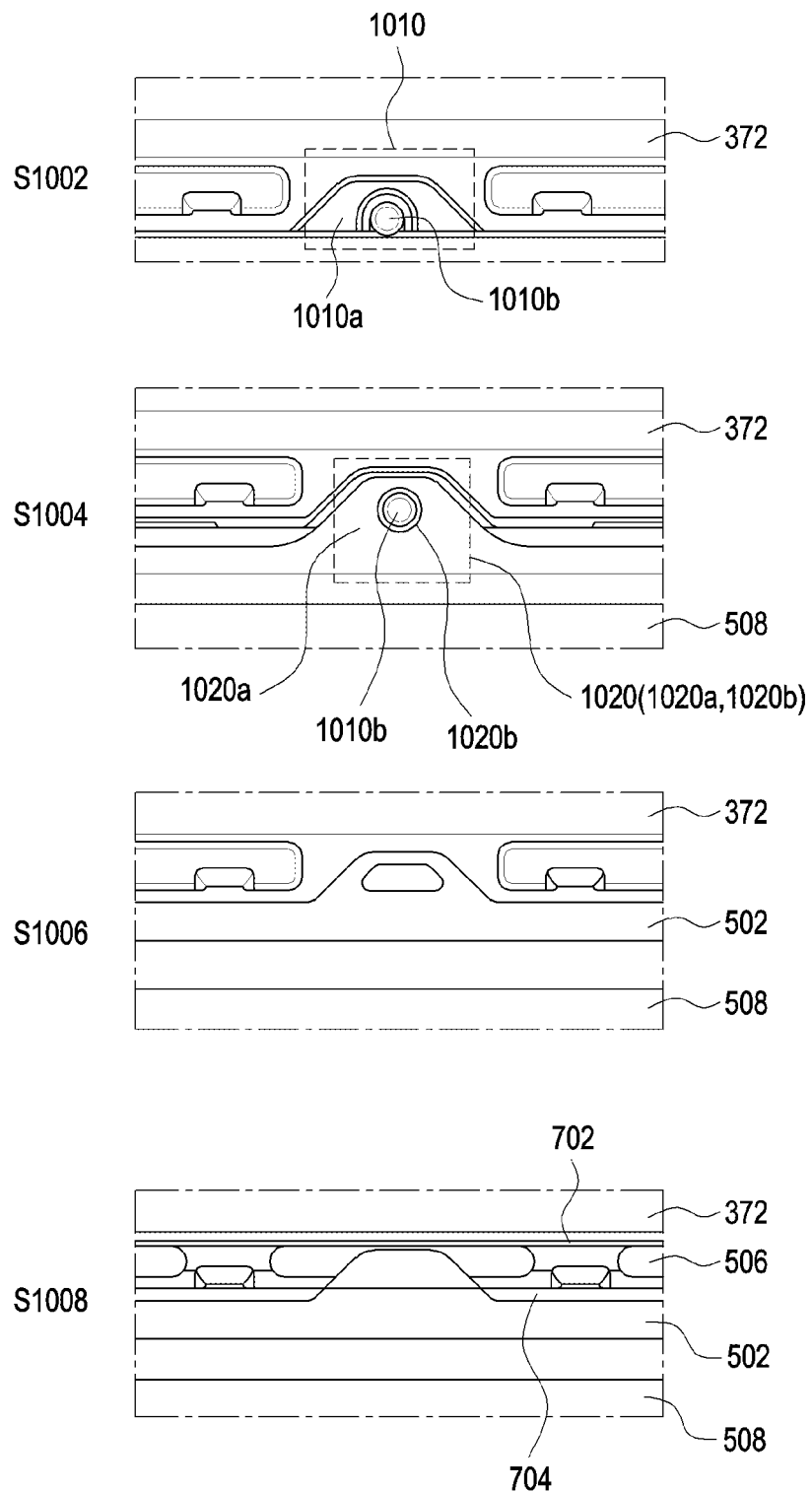
FIG. 10 is a diagram illustrating an anti-slip processes, an insert injection process, and a recess forming process in a specific part of an electronic device according to various embodiments.

According to an embodiment, the first support member 372 may include a mounting structure (e.g., 1010 in FIG. 10). The first support member 372 may be connected to a protrusion part (e.g., 1020 in FIG. 10) of the first metal housing 508 through the mounting structure 1010. The mounting structure 1010 of the first support member 372 and the protrusion part 1020 of the first metal housing 508 may be connected to each other by welding bonding. According to an embodiment, the recess structure 506 may include various shapes having different thicknesses compared to adjacent areas, such as an opening, a hole, or a groove. The recess structure 506 may be disposed along an edge of the first support member 372. According to an embodiment, a part of the recess structure 506 may be coupled with the injection structure 502. A wiring (e.g., a coaxial cable) (e.g., 901 in FIG. 9), an electronic component, or the like may be disposed in the recess structure 506. The recess structure 506 may be formed by a computer numerical control (CNC) machining method. The recess structure 506 may be formed through a recess forming process (e.g., a recess forming process S1008 in FIG. 10). According to an embodiment, the battery accommodation groove 504 is a space for mounting the battery therein, and the size of the battery may be determined according to the thickness of a sidewall structure (e.g., 702 in FIG. 7) of the first support member 372.

According to various embodiments, the first metal housing 508 may be formed along an edge of the electronic device 101. The first metal housing 508 may be formed to be spaced apart from at least part of the first support member 372. The first metal housing 508 may include the protrusion part 1020 to be connected to at least part of the first support member 372. The first metal housing 508 may be connected to the mounting structure 1010 of the first support member 372 through the protrusion part 1020. When the protrusion part 1020 is connected to the mounting structure 1010 of the first support member 372, it may be connected by welding bonding. The first metal housing 508 may be formed of a metal material, and the metal material may be an AL series (e.g., AL 6013, AL7003H, or AL 7S10). The metal material may be Mg and various casting materials (e.g., die casting materials such as S33N and S36). At least part of the first metal housing 508 may be connected to the injection structure 502.

According to various embodiments, the injection structure 502 may be connected to a part of the first support member 372. The injection structure 502 may be connected to a part of the first metal housing 508. The injection structure 502 may be disposed between the first support member 372 and the first metal housing 508. The injection structure 502 may be formed to correspond to the shapes of the first support member 372 and the first metal housing 508. The injection structure 502 may be formed of a non-conductive material. The injection structure 502 may be formed in an insert injection process. The insert injection process may be a process of inserting a metal into an injection mold to bond a resin material (e.g., a synthetic resin) to the metal. According to an embodiment, the resin material may be a synthetic resin (e.g., plastic) or a natural resin, and may be an amorphous solid or semi-solid comprising an organic compound and its derivative.

According to various embodiments, the recess structure 506 of the first support member 372 may be formed by cutting together a connection part of the first support member 372 and the first metal housing 508, and the injection structure 502. The CNC machining method may be used for the cutting.

Figure 7:
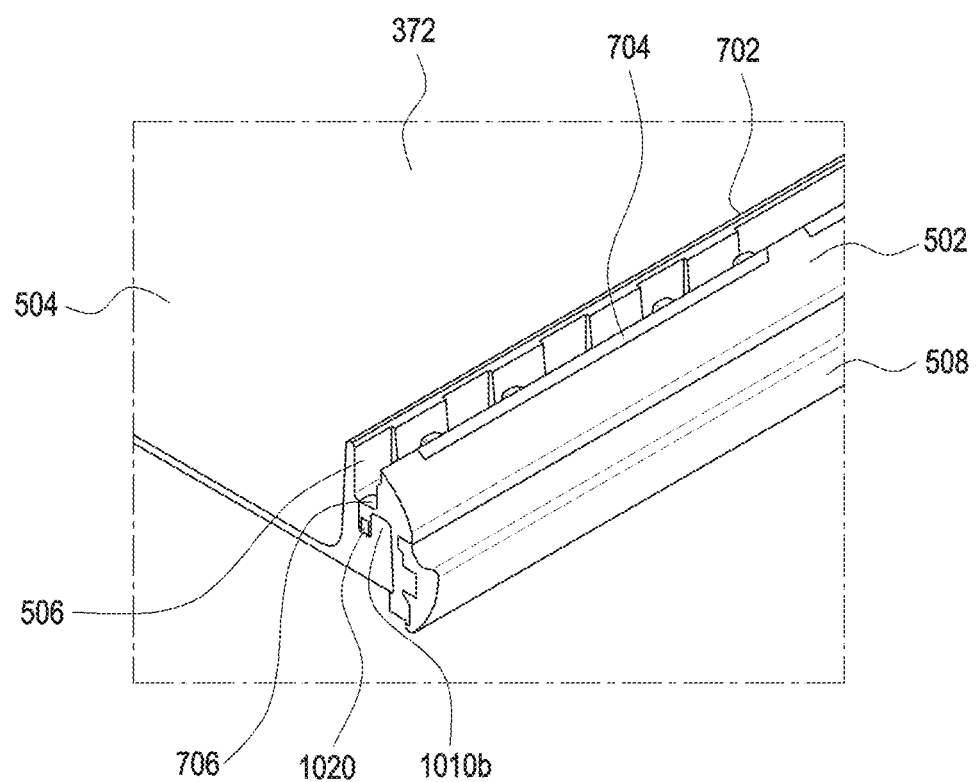
FIG. 7 is an enlarged sectional perspective view illustrating an area S1, taken along line A-A' in FIG. 6 according to various embodiments.

FIG. 7 is an enlarged sectional perspective view illustrating an area S1, taken along line A-A' in FIG. 6 according to various embodiments.

The A-A' part of FIG. 6 may be referred to as a first connection part. According to an embodiment, the electronic device 101 may include at least one first connection part. The first connection part may be a part in which the mounting structure 1010 of the first support member 372 and the protrusion part 1020 of the first metal housing 508 are connected.

According to various embodiments, an electronic device (e.g., the electronic device 101 of FIGS. 1 to 4) may include the first support member 372, the first metal housing 508, and/or the injection structure 502. The first support member 372 may also be referred to as a second metal housing.

In the electronic device 101 of FIG. 7, the configurations of the first support member 372, the first metal housing 508, and the injection structure 502 may be partially or wholly identical to that of the first support member 372, the first metal housing 508, and/or the injection structure 502 of FIGS. 2 to 4.

According to various embodiments, the first support member 372 may include the battery accommodation groove 504 and the recess structure 506. A part of the first support member 372 may be coupled with the injection structure 502. Another part of the first support member 372 may be connected to a part of the first metal housing 508 or may be formed to be spaced apart from another part of the first metal housing 508. The first support member 372 may have a mounting structure (e.g., 1010 of FIG. 10). The first support member 372 may be coupled with a protrusion part (e.g., 1020 of FIG. 10) of the first metal housing 508 through the mounting structure. The mounting structure 1010 of the first support member 372 and the protrusion part 1020 of the first metal housing 508 may be connected to each other by welding bonding. The first support member 372 may be formed of a metal material, and the metal material may be aluminum or Mg and various casting materials (e.g., die casting materials such as S33N and S36).

According to various embodiments, the recess structure 506 may include various shapes having different thicknesses compared to adjacent areas, such as an opening, a hole, or a groove. The recess structure 506 may be disposed along an edge of the first support member 372. The recess structure 506 may include a first sidewall structure 702, a second sidewall structure 704, and a mounting surface 706. The first sidewall structure 702 may be formed of the first support member 372. The second sidewall structure 704 may have a first part formed of the first support member 372, and a second part formed of the injection structure 502. The mounting surface 706 may have a first part formed of the first support member 372 and a second part formed of the injection structure 502. A part of the recess structure 506 may be connected to the injection structure 502. A wiring (e.g., a coaxial cable, etc.) (e.g., 901 of FIG. 9), an electronic component, or the like may be disposed in the recess structure 506. The recess structure 506 may be formed in a recess forming process (e.g., the recess forming process S1008 in FIG. 10).

According to various embodiments, in the first connection part, at least part of the second sidewall structure 704 may be configured as an injection structure. In the first connection part, at least part of the mounting surface 706 may be configured as an injection structure. The first connection part may be a part in which the first support member 372 and the first metal housing 508 are bonded for an anti-slip process (e.g., the anti-slip process S1002 and S1004 in FIG. 10). For the anti-slip process, the first support member 372 may include the mounting structure (e.g., 1010 of FIG. 10). The first support member 372 may be coupled with the protrusion part (e.g., 1020 of FIG. 10) of the first metal housing 508 through the mounting structure 1010. The mounting structure 1010 of the first support member 372 and the protrusion part 1020 of the first metal housing 508 may be connected by welding bonding. When the recess structure 506 is formed after the anti-slip process, part of the first metal housing 508 may be included on the bottom of the mounting surface 706 of the recess structure 506.

According to various embodiments, the battery accommodation groove 504 is a space for mounting the battery therein, and the size of the battery may be determined according to the thickness of the first sidewall structure 702. For example, when the thickness of the first sidewall structure 702 is large, the size of the battery may decrease, and when the thickness of the first sidewall structure 702 is small, the size of the battery may increase.

According to various embodiments, the first metal housing 508 may be formed along the edge of the electronic device 101. For the anti-slip process, the first metal housing 508 may include the protrusion part 1020. The first metal housing 508 may be connected to the mounting structure 1010 of the first support member 372 through the protrusion part 1020. When the protrusion part 1020 is connected to the mounting structure 1010 of the first support member 372, it may be connected by welding bonding. The first metal housing 508 may be formed of a metal material, and the metal material may be an AL series (e.g., AL 6013, AL7003H, or AL 7S10). The metal material may be Mg and various casting materials (e.g., die casting materials such as S33N and S36). The first metal housing 508 may have various shapes according to the exterior design of the terminal. The first metal housing 508 may be formed at a lower position than the first support member 372.

According to various embodiments, the injection structure 502 may be connected to a part of the first support member 372, and may be connected to a part of the first metal housing 508. The injection structure 502 may be disposed between the first support member 372 and the first metal housing 508. The injection structure 502 may be formed to correspond to the shapes of the first support member 372 and the first metal housing 508. The injection structure 502 may be formed of a non-conductive material. The injection structure 502 may be formed through an insert injection process (e.g., the insert injection process S1006 in FIG. 10). The insert injection process may be a process of inserting a metal into an injection mold to bond a resin material (e.g., a synthetic resin) to the metal. According to an embodiment, the resin material may be a synthetic resin (e.g., plastic) or a natural resin, and may be an amorphous solid or semi-solid comprising an organic compound and its derivative. The shape of the injection structure 502 may be formed in any of various shapes according to the shape of the electronic device 101. A part of the injection structure 502 may be formed at a higher position than the first metal housing 508, and an exposed part thereof may include a smooth curved structure.

Figure 8:
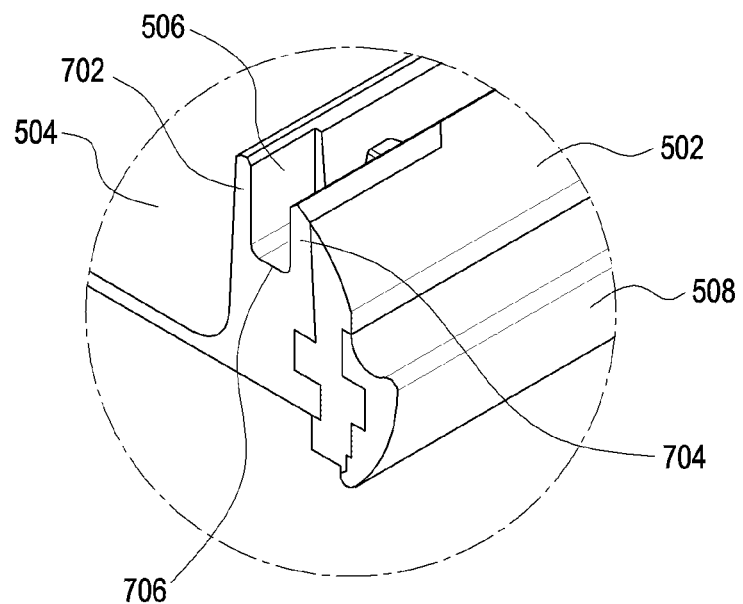
FIG. 8 is an enlarged sectional perspective view illustrating an area S2, taken along line B-B' in FIG. 6 according to various embodiments.

FIG. 8 is an enlarged sectional perspective view illustrating an area S2, taken along line B-B' in FIG. 6 according to various embodiments. FIG. 9 is a cross-sectional view illustrating a wiring, taken along line B-B' in FIG. 5 or 6 according to various embodiments.

The B-B' part of FIG. 6 may be referred to as a second connection portion. According to an embodiment, the electronic device 101 may include at least one second connection part.

Referring to FIGS. 8 and 9, an electronic device (e.g., the electronic device 101 of FIGS. 1 to 4) may include the first support member 372, the first metal housing 508, the injection structure 502, and/or a wiring (e.g., coaxial cable) 901. The first support member 372 may also be referred to as a second metal housing.

In the electronic device 101 of FIGS. 8 and 9, the configuration of the first support member 372, the first metal housing 508, the injection structure 502, and/or the wiring 901 may be partially or wholly identical to that of the support member 372, the first metal housing 508, the injection structure 502, and/or the wiring 901 of FIG. 7.

According to various embodiments, the first support member 372 may include the battery accommodation groove 504 and the recess structure 506. A part of the first support member 372 may be coupled with the injection structure 502. A part of the first support member 372 may be connected to a part of the first metal housing 508 or may be formed to be spaced apart from another part of the first metal housing 508. The first support member 372 may be formed of a metal material, and the metal material may be aluminum or Mg and various casting materials (e.g., die casting materials such as S33N and S36).

According to various embodiments, the recess structure 506 may include various shapes having different thicknesses compared to adjacent areas, such as an opening, a hole, or a groove. The recess structure 506 may be disposed along an edge of the first support member 372. The recess structure 506 may include the first sidewall structure 702, the second sidewall structure 704, and the mounting surface 706. The first sidewall structure 702 may include the first support member 372. The second sidewall structure 704 may have a first part formed of the first support member 372, and a second part formed of the injection structure 502. The mounting surface 706 may have a first part formed of the first support member 372 and a second part formed of the injection structure 502. A part of the recess structure 506 may be connected to the injection structure 502. The wiring 901 (e.g., a coaxial cable or the like), an electronic component, or the like may be disposed in the recess structure 506. According to an embodiment, in the second connection part, at least part of the second sidewall structure 704 may be formed of the first support member 372. In the second connection part, at least part of the mounting surface 706 may be formed of the first support member 372. In the second connection part, the first support member 372 and the first metal housing 508 may be disposed to be spaced apart from each other.

According to various embodiments, the battery accommodation groove 504 is a space for mounting the battery therein, and the size of the battery may be determined according to the thickness of the first sidewall structure 702. For example, when the thickness of the first sidewall structure 702 is large, the size of the battery may decrease, and when the thickness of the first sidewall structure 702 is small, the size of the battery may increase.

According to various embodiments, in the second connection part, the second sidewall structure 704 may be formed of the first support member 372. In the second connection portion, at least part of the mounting surface 706 may be formed of the first support member 372. In the second connection portion, the first support member 372 and the first metal housing 508 may be disposed to be spaced apart from each other.

According to various embodiments, the first metal housing 508 may be formed along an edge of the electronic device 101. The first metal housing 508 may be formed of a metal material, and the metal material may be an AL series (e.g., AL 6013, AL7003H, or AL 7S10). The metal material may be Mg and various casting materials (e.g., die casting materials such as S33N and S36). The first metal housing 508 and the first support member 372 may be spaced apart from each other. The first metal housing 508 may be formed in any of various shapes according to the exterior design of the terminal. The first metal housing 508 may be formed at a lower position than the first support member 372.

According to various embodiments, the injection structure 502 may be connected to a part of the first support member 372, and may be connected to a part of the first metal housing 508. The injection structure 502 may be disposed between the first support member 372 and the first metal housing 508. The injection structure 502 may be formed to correspond to the shapes of the first support member 372 and the first metal housing 508. The injection structure 502 may be formed of a non-conductive material. The injection structure 502 may be formed through an insert injection process. The insert injection process may be a process of inserting a metal into an injection mold to bond a resin material (e.g., synthetic resin) to the metal. According to an embodiment, the resin material may be a synthetic resin (e.g., plastic) or a natural resin, and may be an amorphous solid or semi-solid comprising an organic compound and its derivative. The shape of the injection structure 502 may be variously determined according to the shape of the terminal. A part of the injection structure 502 may be formed at a higher position than the first metal housing 508, and an exposed part thereof may include a smooth curved structure.

FIG. 10 is a diagram illustrating the anti-slip process S1002 and S1004, the insert injection process S1006, and the recess forming process S1008 in a part of the electronic device 101 according to various embodiments.

According to various embodiments, a method of manufacturing the electronic device 101 may include the anti-slip process S1002 and S1004, the insert injection process S1006, and the recess forming process S1008. The anti-slip process S1002 and S1004 may be a process performed before the insert injection process S1006.

According to various embodiments, the anti-slip process S1002 and S1004 may be performed using the first support member 372 including the mounting structure 1010 and the first metal housing 508 including the protrusion part 1020. The first connection part may be a place where the mounting structure 1010 of the first support member 372 and the protrusion part 1020 of the first metal housing 508 are bonded. The first support member 372 may include the mounting structure 1010 in the first connection part. The first metal housing 508 may include the protrusion part 1020 in the first connection part. There may be at least one first connection part in the electronic device 101. In the anti-slip process S1002 and S1004, the first support member 372 may include at least one mounting structure 1010. The mounting structure 1010 may include a groove 1010a formed lower than the first support member 372 in the vicinity. The groove 1010a may be formed to match the shape of a protruding surface 1020a of the first metal housing 508. The shape of the groove 1010a may be variously determined according to the shape of the electronic device 101. The mounting structure 1010 may include a pole 1010b protruding in the form of a column at the center of the groove 1010a. The pole 1010b may be connected to a hole 1020b in the protrusion part 1020 of the first metal housing 508.

According to various embodiments, the first metal housing 508 may include at least one protrusion part 1020. The protruding portion may include the protruding surface 1020a and the hole 1020b. The protrusion part 1020 may be included in the first connection part of the first metal housing. The shape of the protruding surface 1020a may be determined according to the shape of the groove 1010a of the mounting structure 1010 of the first support member 372. For example, the protruding surface 1020a may be trapezoidal in shape. The protruding surface 1020a and the groove 1010a may be partially spaced apart when connected. The protrusion part 1020 may include the hole 1020b that matches the shape of the pole 1010b of the mounting structure 1010. The pole 1010b and the hole 1020b may be fitted to be coupled with each other. According to an embodiment, the mounting structure 1010 and the protrusion part 1020 may be welded to each other. For example, laser welding bonding may be used. According to an embodiment, the protrusion part 1020 may be bonded only to the mounting structure 1010, while being spaced apart from the first support member 372 except for the mounting structure 1010. Due to the spaced arrangement, bending or damage of the electronic device 101 may be reduced or prevented during the subsequent insert injection process S1006.

According to various embodiments, the first support member 372 and the first metal housing 508 may be disposed spaced apart from each other in at least part (e.g., the second connection part) thereof. As the mounting structure 1010 of the first support member 372 and the protrusion part 1020 of the first metal housing 508 are connected to each other in the first connection part, it is possible to reduce or prevent bending or damage of the electronic device 101 caused by an applied external force during the subsequent insert injection process S1006 or recess forming process S1008.

According to various embodiments, the injection structure 502 may be formed through the insert injection process S1006. The manufacturing method of the electronic device 101 may include the insert injection process S1006 in which the injection structure 502 is formed by disposing a resin material between the first support member 372 and the first metal housing 508 to surround the mounting structure 1010 and the protrusion part 1020. For example, the insert injection process may be a process of inserting a metal into an injection mold to bond a resin material (e.g., synthetic resin) to the metal. According to an embodiment, the resin material may be a synthetic resin (e.g., plastic) or a natural resin, and may be an amorphous solid or semi-solid comprising an organic compound and its derivative. The insert injection process S1006 may be performed after the anti-slip process S1002 and S1004. The injection structure 502 may be positioned in a space between the first support member 372 and the first metal housing 508 through the insert injection process S1006. According to an embodiment, the injection structure 502 may be formed to correspond to an outer shape of the first support member 372 and an inner shape of the first metal housing 508. According to an embodiment, the injection structure 502 may surround at least part of the connected mounting structure 1010 and protrusion part 1020 in the first connection part. The shape of the injection structure 502 may vary depending on the shape of the mold.

According to various embodiments, the recess structure 506 may be formed through the recess forming process S1008. The manufacturing method of the electronic device 101 may include the recess forming process S1008 in which the recess structure 506 is formed by processing the injection structure 502 surrounding the at least part of the connected first mounting structure 1010 and protrusion part 1020, and the first support member 372. For example, the processing may be a CNC machining method. The recess structure 506 may include various shapes having different thicknesses compared to adjacent areas, such as an opening, a hole, or a groove. The recess structure 506 may be disposed along the edge of the first support member 372. The recess structure 506 may include the first sidewall structure 702, the second sidewall structure 704, and the mounting surface 706. A wiring (e.g., a coaxial cable, etc.), an electronic component, or the like may be disposed in the recess structure 506. According to an embodiment, at least part of the second sidewall structure 704 may be formed as an injection structure in the first connection part. In the first connection part, at least part of the mounting surface 706 may be formed as an injection structure. In the second connection part, the second sidewall structure 704 may be formed of the first support member 372. In the second connection part, at least part of the mounting surface 706 may be formed of the first support member 372. The first sidewall structure 702 may be formed of the first support member 372.

The anti-slip process S1002 and S1004, the insert injection process S1006, and the recess forming process S1008 may be performed between the first support member 372 and the first metal housing 508, and used to form a recess in various other shape-matching parts (e.g. an FPCB) as well.

Figure 11:
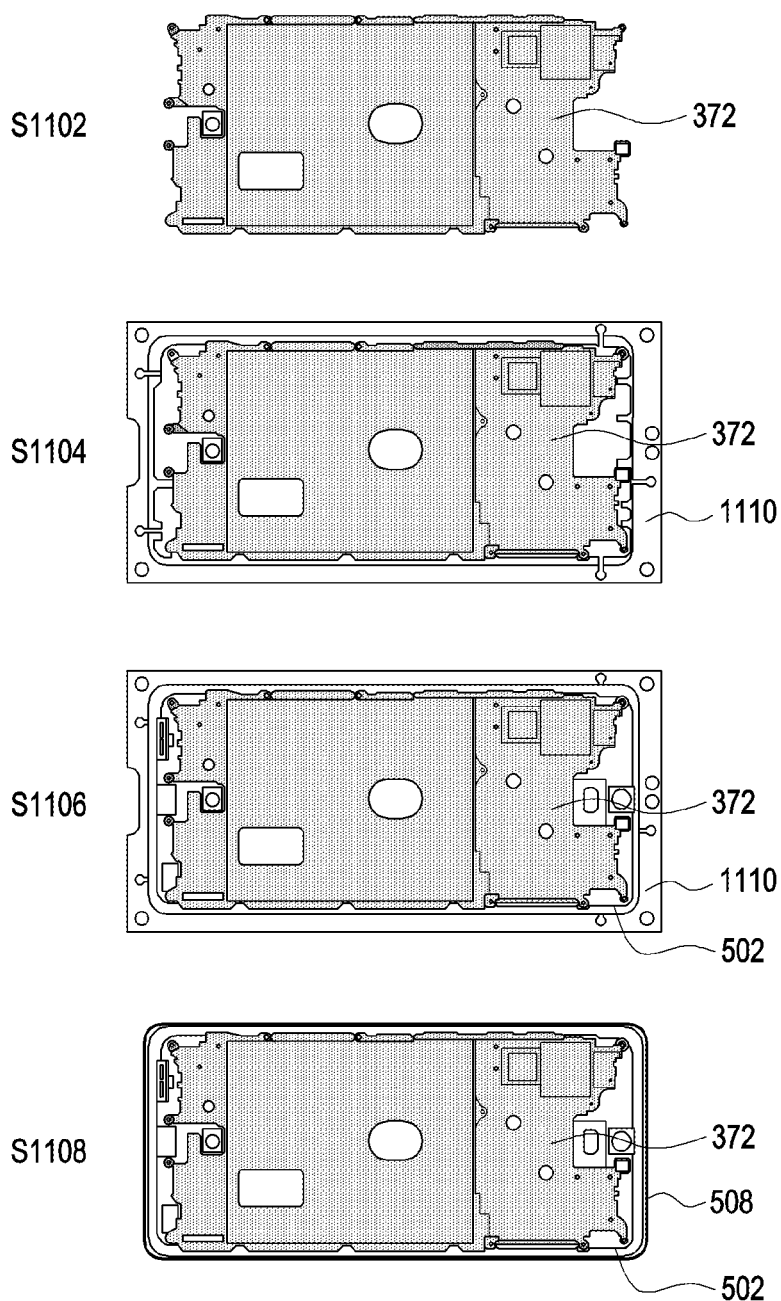
FIG. 11 is a diagram illustrating an example process of forming the front of the electronic device according to various embodiments.

FIG. 11 is a diagram illustrating an example process of forming the front of the electronic device 101 according to various embodiments.

According to various embodiments, a method of manufacturing the electronic device 101 may include a process of forming the first support member 372 S1102, a connection process S1104 of bonding the first support member 372 and an external metal area 1110, an insert injection process S1106, and/or an internal or external processing process S1108. The first metal housing 508 may be formed during processing of the external metal area 1110.

According to various embodiments, the process S1102 of forming the first support member 372 may be performed using a metal material, and the first support member 372 may include the battery accommodation groove 504 through the forming process S1102. The first support member 372 may include the mounting structure 1010 including the groove 1010a and the pole 1010b.

According to various embodiments, the connection process S1104 of bonding the first support member 372 and the external metal area 1110 may be performed using the anti-slip process S1002 and S1004 of FIG. 10. For example, the connection process S1104 may be performed using the mounting structure 1010 of the first support member 372 and the protrusion part 1020 of the external metal area 1110. According to an embodiment, the groove 1010a of the mounting structure 1010 may be bonded to the protruding surface 1020a of the protrusion part 1020. According to an embodiment, the pole 1010b of the mounting structure 1010 may be inserted into and connected to the hole 1020b of the protrusion part 1020. The mounting structure 1010 and the protrusion part 1020 may be welded to each other during connection. For example, laser welding bonding may be used. The connection process S1104 of bonding the first support member 372 and the external metal area 1110 may be performed after the process S1102 of forming the first support member 372.

According to various embodiments, the insert injection process S1106 performed between the first support member 372 and the outer metal region 1110 may be performed in the same manner as the insert injection process S1006 of FIG. 10. The insert injection process may be a process of inserting a metal into an injection mold to bond a resin material (e.g., synthetic resin) to the metal. According to an embodiment, the resin material may be a synthetic resin (e.g., plastic) or a natural resin, and may be an amorphous solid or semi-solid comprising an organic compound and its derivative. The insert injection process S1106 may be performed after the connection process S1104 of bonding the first support member 372 and the external metal area 1110. The injection structure 502 may be positioned in the space between the first support member 372 and the external metal area 1110 through the insert injection process S1106. According to an embodiment, the injection structure 502 may be formed to correspond to the outer shape of the first support member 372 and the inner shape of the external metal area 1110. According to an embodiment, the injection structure 502 may surround at least part of the connected mounting structure 1010 and protrusion part 1020 in the first connection part. The shape of the injection structure 502 may vary depending on the shape of the mold.

According to various embodiments, the internal and external processing process S1108 of the electronic device 101 may include the recess forming process S1008 of FIG. 10 and a cutting process of processing the external metal area 1110. The recess forming process may be performed in the same manner as the recess forming process S1008 of FIG. 10. According to an embodiment, the cutting process may include processing the external metal area 1110 to form the first metal housing 508. The cutting process may be performed to form the first metal housing 508 having a predetermined shape out of the external metal area 1110. The shape of the first metal housing 508 may be determined according to the exterior design of the electronic device 101.

According to various example embodiments of the disclosure, an electronic device (e.g., the electronic device 101 of FIGS. 1 to 4) may include: a first metal housing (e.g., the first metal housing 508 of FIGS. 5 to 11) formed along an edge of the electronic device, a second metal housing (e.g., the first support member 372 of FIGS. 5 to 11) spaced apart from at least part of the first metal housing, and an injection structure (e.g., the injection structure 502 of FIGS. 5 to 11) at least partially disposed between the first metal housing and the second metal housing, and comprising a non-conductive material. The injection structure and the second metal housing may include a recess part (e.g., the recess structure of FIGS. 5 to 10) disposed along an inner edge of the electronic device configured to mount an electrical component therein. The second metal housing may include a first part (e.g., the mounting structure 1010 of FIG. 10) connected to the first metal housing, and a second part spaced apart from the first metal housing. The first metal housing may include a protrusion part (e.g., the protrusion part 1020 of FIG. 10), and the protrusion part may extend to the first part and be bonded to the first part.

According to various example embodiments, the recess part may include a first sidewall (e.g., the first sidewall 702 of FIGS. 7 to 10) on an inner side of the electronic device, a second sidewall (e.g., the second sidewall 704 of FIGS. 7 to 10) corresponding to the first sidewall, and a mounting surface (e.g., the mounting surface 706 of FIGS. 7 to 9) on which the electrical component is mounted. The first sidewall may be formed of the second metal housing.

According to various example embodiments, at least part of the second sidewall may be formed of the second metal housing, and at least part of the mounting surface may be formed of the second metal housing.

According to various example embodiments, the recess part may be CNC machined.

According to various example embodiments, the recess part may provide an area in which a wiring connecting components inside the electronic device is mounted.

According to various example embodiments, the wiring may include a coaxial cable.

According to various example embodiments, when viewed from an inner cross section, the first part may include a mounting structure (e.g., the mounting structure 1010 of FIG. 10), and the mounting structure may include a groove structure (e.g., the groove 1010a of FIG. 10) and a pole structure (e.g., the pole 1010b of FIG. 10).

According to various example embodiments, when viewed from the inner cross section, the protrusion part may include a protruding surface (e.g., the protruding surface 1020a of FIG. 10) and a hole structure (e.g., the hole 1020b of FIG. 10).

According to various example embodiments, the pole structure and the hole structure may be welded.

According to various example embodiments, the first metal housing may comprise an aluminum (AL) series or magnesium (Mg) and a die casting material, and the second metal housing may comprise an aluminum (AL) series or magnesium (Mg) and a die casting material.

According to various example embodiments, the electronic device may further include a battery, and the second metal housing may further include an accommodation groove (e.g., the battery accommodation groove 504 of FIGS. 5 to 8) configured to accommodate the battery therein.

According to various example embodiments, a size of the accommodation groove may be based on a thickness of the first sidewall.

According to various example embodiments of the disclosure, a method of manufacturing an electronic device (e.g., the electronic device 101 of FIGS.>1 to 4) may include: connecting (e.g., the anti-slip process S1002 and S1004 of FIG. 10) a first metal housing (e.g., the first metal housing 508 of FIGS. 5 to 11) including a protrusion part (e.g., the protrusion part 1020 of FIG. 10) to a second metal housing (e.g., the first support member 372 of FIGS. 5 to 11), forming (e.g., the insert injection process S1006 of FIG. 10) an injection structure (e.g., the injection structure 502 of FIGS. 5 to 11) disposed between the first metal housing and the second metal housing and comprising a non-conductive material, and forming (e.g., the recess forming process S1008 of FIG. 10) a recess part (e.g., the recess structure 506 of FIGS. 5 to 10) disposed along an inner edge of the electronic device, configured to mount an electrical component (e.g., the wiring 901 of FIG. 9) therein, by processing the second metal housing and the injection structure. The second metal housing may be at least partially spaced apart from the first metal housing, and include a first part (e.g., the mounting structure 1010 of FIG. 10) connected to the first metal housing and a second part spaced apart from the first metal housing. The protrusion part may be extend to the first part and be bonded to the first part.

According to various example embodiments, the recess part may include a first sidewall (e.g., the first sidewall 702 of FIGS. 7 to 10) on an inner side of the electronic device, a second sidewall (e.g., the second sidewall 704 of FIGS. 7 to 10) corresponding to the first sidewall, and a mounting surface (e.g., the mounting surface 706 of FIGS. 7 to 9) on which the electrical component is mounted. The first sidewall may be formed of the second metal housing.

According to various example embodiments, at least part of the second sidewall may be formed of the second metal housing, and at least part of the mounting surface may be formed of the second metal housing.

According to various example embodiments, the recess part may provide an area in which a wiring connecting components inside the electronic device is mounted.

According to various example embodiments, forming the recess part may be performed by CNC machining.

According to various example embodiments, when viewed from an inner cross section, the first part may include a mounting structure (e.g., the mounting structure 1010 of FIG. 10), and the mounting structure may include a groove structure (e.g., the groove 1010a of FIG. 10) and a pole structure (e.g., the pole 1010b of FIG. 10).

According to various example embodiments, when viewed from the inner cross section, the protrusion part may include a protruding surface (e.g., the protruding surface 1020a of FIG. 10) and a hole structure (e.g., the hole 1020b of FIG. 10). The pole structure may be inserted into the hole structure to be connected to the hole structure.

According to various example embodiments, the first metal housing may comprise an aluminum (AL) series or magnesium (Mg) and a die casting material, and the second metal housing may comprise an aluminum (AL) series or magnesium (Mg) and a die casting material.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first metal housing formed at least partially along an edge of the electronic device;
   a second metal housing; and
   an injection structure at least partially disposed between at least the first metal housing and the second metal housing, and comprising a non-conductive material,
   wherein the injection structure and the second metal housing include a recess part disposed along an inner edge of the electronic device and configured to mount an electrical component therein, wherein the recess part includes a first sidewall on an inner side of the electronic device, and a second sidewall spaced from the first sidewall,
   wherein the second metal housing includes a first part connected to the first metal housing, and a second part spaced apart from the first metal housing,
   wherein the first metal housing includes a protrusion part, and
   wherein the protrusion part extends across a part at least partially overlapping a space between the first sidewall and the second sidewall in a thickness direction of the electronic device to the first part and is bonded to the first part.

2. The electronic device of claim 1, wherein the recess part includes a mounting surface on which the electrical component is mounted, and
   wherein the first sidewall is formed of the second metal housing.

3. The electronic device of claim 2, wherein at least part of the second sidewall is formed of the second metal housing, and
   wherein at least part of the mounting surface is formed of the second metal housing.

4. The electronic device of claim 1, wherein the recess part comprises a computer numerical control (CNC) machined part.

5. The electronic device of claim 1, wherein the recess part provides an area in which a wiring connecting component inside the electronic device is mounted.

6. The electronic device of claim 5, wherein the wiring includes a coaxial cable.

7. An electronic device comprising:
- a first metal housing formed along an edge of the electronic device;
- a second metal housing; and
- an injection structure at least partially disposed between the first metal housing and the second metal housing, and comprising a non-conductive material,
- wherein the injection structure and the second metal housing include a recess part disposed along an inner edge of the electronic device and configured to mount an electrical component therein,
- wherein the second metal housing includes a first part connected to the first metal housing, and a second part spaced apart from the first metal housing,
- wherein the first metal housing includes a protrusion part,
- wherein the protrusion part extends to the first part and is bonded to the first part,
- wherein when viewed from an inner cross section, the first part includes a mounting structure,
- wherein the mounting structure includes a groove structure and a pole structure, and the protrusion part includes a protruding surface and a hole structure, and
- wherein the pole structure is inserted into and connected to the hole structure.

8. The electronic device of claim 7, wherein the pole structure and the hole structure are welded.

9. The electronic device of claim 1, wherein the first metal housing comprises an aluminum (AL) series or magnesium (Mg) and a die casting material, and
- wherein the second metal housing comprises an aluminum (AL) series or magnesium (Mg) and a die casting material.

10. The electronic device of claim 1, further comprising a battery,
- wherein the second metal housing further includes an accommodation groove configured to accommodate the battery therein.

11. The electronic device of claim 10, wherein a size of the accommodation groove is determined based on a thickness of the first sidewall.

* * * * *